UNITED STATES PATENT OFFICE 2,410,294

SOFTENING AGENT

Ernst Korten, Frankfort-on-the-Main-Fechenheim, Germany; vested in the Alien Property Custodian No Drawing. Application February 6, 1941, Serial No. 377,711. In Germany February 8, 1940

3 Claims. (Cl. 260—345)

The present invention relates to valuable softening agents more particularly to those of the general formula:

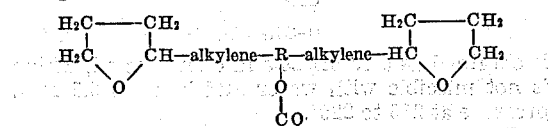

wherein R stands for a member of the group consisting of a methine radical and the methine radical forming a part of a cyclohexane ring and $R_1$ stands for a radical selected from the aliphatic and benzene series the essential characteristic of the methine radical being the existence of three linkages, each of which is satisfied by other separate alkylene or arylene substituents.

The new softening agents are obtained by condensing two molecular proportions of furfural with one molecular proportion of an aliphatic or cycloaliphatic ketone containing reactive alkyl groups, entirely hydrogenating the formed condensation products and esterifying the secondary alcohols thus obtained by means of carboxylic acids of the aliphatic and benzene series or their reactive derivatives.

The present new ester compounds exhibit an excellent softening effect on the various thermoplastic compounds of a high molecular weight and the artificial masses obtained therewith, such as highly polymerised vinyl compounds, polyacrylic acid esters and mixed polymerisation products therefrom, moreover cellulosic derivatives.

In order to further illustrate my present invention the following examples are given, the parts being by weight and all temperatures in degrees centigrade.

Example 1

A mixture of 10 parts of 1.5-ditetrahydrofuryl-3-hydroxypentane and 6.6 parts of acetic acid anhydride is heated for about 2 hours in an apparatus provided with a reflux condenser. Then the formed acetic acid is removed by fractional distillation. Subsequently the reaction product of the formula:

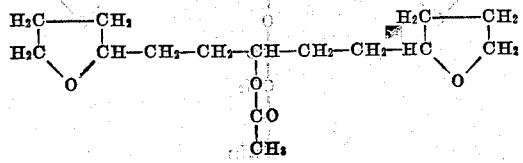

passes over at 1.5 mms. pressure at 180 to 185° as a colorless and odourless oil, which is not miscible with water.

Corresponding products are obtained when replacing the acetic acid by other aliphatic acids such as caproic, caprylic or capric acid.

Example 2

A mixture of 228 parts of the alcohol as used in Example 1 and 250 parts of benzoic acid anhydride is slowly heated at 200° to 220°. When the esterification has been finished the reaction product is digested with a dilute sodium carbonate solution in order to remove the formed benzoic acid. Then the residue is distilled in vacuo. The ester thus obtained of the formula:

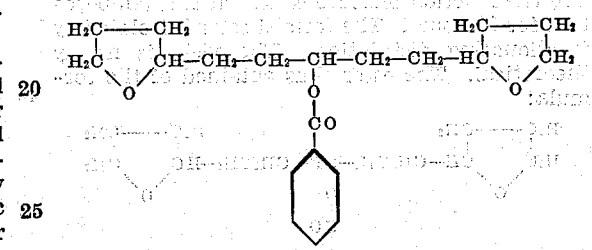

boils at 1 mm. pressure at 200 to 210° as a viscous, colorless and odourless oil.

Corresponding esters are obtained when esterifying with derivatives of benzoic acid being substituted by methyl groups or halogen.

Example 3

50 parts of the alcohol as used in the foregoing examples are mixed with 40 parts of a mixture of carboxylic acids of acid number 324, obtainable by oxidising the higher alcohols, which are well known by-products of the methanol synthesis. The mixture is slowly heated to 200 to 250° while introducing nitrogen into the reaction vessel. With the nitrogen which passes through also water is removed.

The same ester is obtained according to the following method: A mixture of equal quantities of the alcohol and the aforesaid mixture of carboxylic acids is subjected in the presence of toluene as assistant liquor and a small amount of benzene sulfonic acid to the aceotropic distillation. When the splitting off of water has been finished the reaction product is isolated as described in Example 2.

The formed mixture of esters boils at 7 mm. pressure at 180 to 240° as a colorless and odourless oil.

Example 4

When esterifying by means of adipic acid the formed diester of the formula:

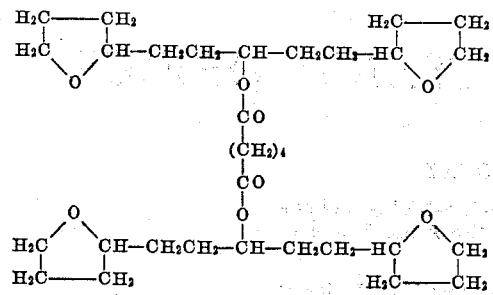

is an odourless oil boiling above 300° at 1.5 mm. pressure.

Instead of adipic acid other dicarboxylic acids such as succinic acid may be used as esterifying agent.

In the manner as described in the foregoing examples other entirely hydrogenated condensation products of furfural with suitable ketones such as methylethylketone, diethylketone, cyclohexanone and its alkylated derivatives such as isooctylcyclohexanone yield valuable products by esterification.

Example 5

A mixture of 246 parts of 1.5-ditetrahydrofuryl-3-hydroxypentane and 116 parts of isoheptoxyacetic acid is heated for about 6 hours at about 140° in a vacuo of 20 to 25 mm. pressure, the formed water distilling off. Then the temperature is increased during about 6 hours to 180° and the reaction mixture is held at this temperature for 12 hours. The formed ester is isolated by fractionating distillation. The yield is nearly theoretical. The ester thus obtained of the formula:

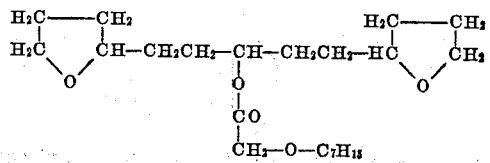

is a colorless and odourless oil, which is not miscible with water and boils at 1 mm. pressure at 210 to 215°.

When replacing the isoheptoxyacetic acid by other ether-carboxylic acids derived from alcohols of a lower or higher number of carbon atoms, such as from α-ethylcyclohexanole or from the higher alcohols, which are well known as by-products of the methanol synthesis, very similar esters are obtained.

Example 6

A mixture of 246 parts of 1.5-ditetrahydrofuryl-3-hydroxypentane and 152 parts of phenoxyacetic acid is heated at reduced pressure. With an almost theoretical yield by fractional distillation the formed ester of the formula:

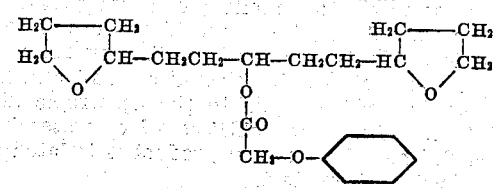

is obtained as a colorless and odourless oil, which boils at 223 to 226° at 0.7 mm. pressure and is not miscible with water.

A similar ester is obtained when using the phenoxy propionic acid as esterifying agent.

Example 7

By condensing the alkali metal compound of glycolmonobutylether with the sodium salt of monochloroacetic acid there is obtained the dietheracetic acid of the formula:

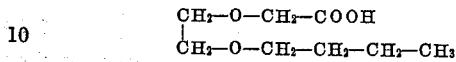

boiling at 15 mm. pressure at 163 to 165°.

176 parts of this acid are mixed with 246 parts of 1.5-ditetrahydrofuryl-3-hydroxypentane and the mixture is heated at reduced pressure. With an almost theoretical yield the ester of the formula:

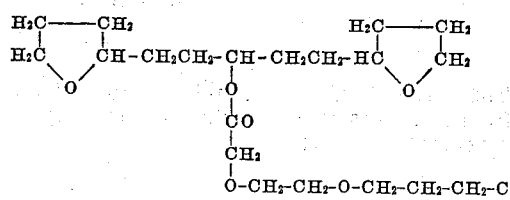

is obtained as a colorless and odourless oil, which is not miscible with water and boils at 0.5 mm. pressure at 215 to 220°.

The ethercarboxylic acid derived from glycolmonophenylether yields an ester of similar properties.

Example 8

300 parts of 2.6-di-trahydrofurfurylmethyl-cyclohexanol obtainable by hydrogenating the yellow condensation product of two molecular proportions of furfural and one molecular proportion of cyclohexanone are mixed with 400 parts of acetic acid anhydride and the mixture is heated under reflux for about 3 hours. By a fractionating distillation with an almost theoretical yield the formed ester of the formula:

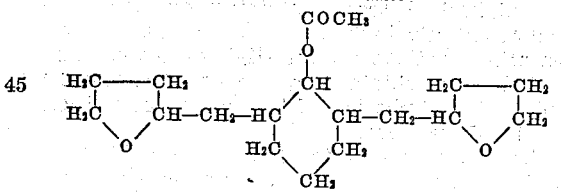

is obtained as a colorless oil boiling at 0.6 mm. pressure at 190 to 200°.

I claim:

1. A softening agent of the formula:

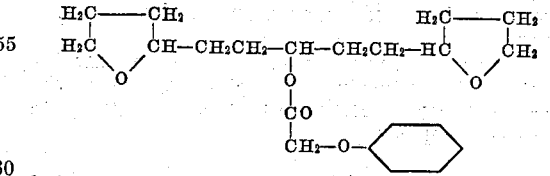

being a colorless and odourless oil, which boils at 223 to 226° at 0.7 mm. pressure and is not miscible with water, and exhibits an excellent softening effect on thermoplastic compounds of high molecular weight and cellulose derivatives.

2. A softening agent of the formula:

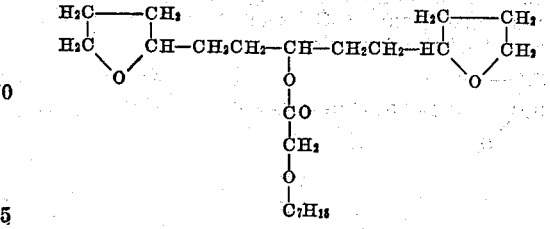

being a colorless and odourless oil, which boils at 210 to 215° at 1 mm. pressure and is not miscible with water, and exhibits an excellent softening effect on thermoplastic compounds of high molecular weight and cellulose derivatives.
3. Softening agents of the general formula
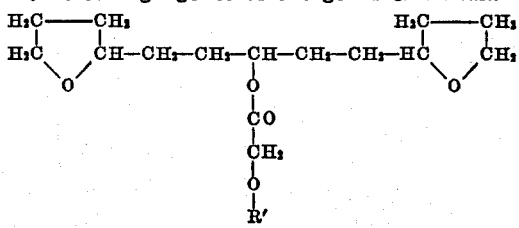
wherein, R' is selected from the group consisting of alkyl and aryl.
ERNST KORTEN.